United States Patent
Todoroki

(10) Patent No.: US 7,977,417 B2
(45) Date of Patent: Jul. 12, 2011

(54) SILICONE RUBBER COMPOSITION FOR EXTRUSION MOLDING

(75) Inventor: Daichi Todoroki, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 12/630,080

(22) Filed: Dec. 3, 2009

(65) Prior Publication Data

US 2010/0080999 A1    Apr. 1, 2010

Related U.S. Application Data

(62) Division of application No. 11/852,676, filed on Sep. 10, 2007.

(30) Foreign Application Priority Data

Sep. 11, 2006  (JP) ................. 2006-244945

(51) Int. Cl.
*C08K 5/5419* (2006.01)
*C08K 3/36* (2006.01)

(52) U.S. Cl. .................... 524/266; 524/492

(58) Field of Classification Search ............ 524/492, 524/266
See application file for complete search history.

(56) References Cited

U.S. PATENT DOCUMENTS

| | | | |
|---|---|---|---|
| 4,984,860 A * | 1/1991 | Seike et al. ............ 385/147 |
| 5,335,749 A | 8/1994 | Taguchi et al. | |
| 5,405,896 A | 4/1995 | Fujiki et al. | |
| 5,883,171 A | 3/1999 | Matsushita et al. | |
| 6,339,124 B1 | 1/2002 | Igarashi et al. | |
| 2001/0011106 A1 | 8/2001 | Yaginuma et al. | |
| 2004/0067003 A1 | 4/2004 | Chiliaguine et al. | |
| 2006/0014896 A1 | 1/2006 | Iwata | |
| 2007/0212819 A1 | 9/2007 | Tamaru et al. | |

FOREIGN PATENT DOCUMENTS

| | | |
|---|---|---|
| JP | 54-47667 | 4/1979 |
| JP | 2-124977 | 5/1990 |
| JP | 2-235003 | 9/1990 |
| JP | 4-96004 | 3/1992 |
| JP | 4-361126 | 12/1992 |
| JP | 10-77413 | 3/1998 |
| JP | 11-165324 | 6/1999 |
| JP | 2001-82918 | 3/2001 |
| JP | 2001-342346 | 12/2001 |
| JP | 2002-267549 | 9/2002 |
| JP | 2006-500284 | 1/2006 |
| WO | 01/23224 | 4/2001 |

* cited by examiner

*Primary Examiner* — Milton I Cano
*Assistant Examiner* — John Uselding
(74) *Attorney, Agent, or Firm* — Oblon, Spivak, McClelland, Maier & Neustadt, L.L.P.

(57) ABSTRACT

Provided is a silicone rubber composition for extrusion molding, including: (A) 100 parts by mass of an organopolysiloxane represented by an average composition formula (1): $R^1{}_n SiO_{(4-n)/2}$ (in the formula, $R^1$ represents identical or different, unsubstituted or substituted monovalent hydrocarbon groups, and n represents a positive number within a range from 1.95 to 2.04), (B) 0 to 50 parts by mass of a vinyl group-containing silicon compound, (C) 5 to 100 parts by mass of a reinforcing silica, and (D) an effective quantity of a curing agent, in which the vinyl group content relative to the combination of the components (A) through (D) is at least $1.0 \times 10^{-4}$ mol/g. The composition yields a cured product for which the elastic modulus increases across a temperature range from 30 to 110° C. and which is therefore capable of reducing the temperature dependency of acrylic optical fibers. The composition is suitable for extrusion molding.

14 Claims, No Drawings

SILICONE RUBBER COMPOSITION FOR EXTRUSION MOLDING

This application is a division of application Ser. No. 11/852,676, filed Sep. 10, 2007, now abandoned Apr. 20, 2010, which claims priority to JP 2006-244945, filed Sep. 11, 2006.

BACKGROUND OF THE INVENTION

1. Field of the Invention

The present invention relates to a silicone rubber composition for extrusion molding that yields a cured product for which the elastic modulus increases across a temperature range from 30 to 110° C.

2. Description of the Prior Art

Tests are being conducted in which special optical fiber sensors are embedded within high-performance structural materials such as composite materials, and these sensors are then used to continually monitor the structural materials for distortion and the like. For example, a method has been disclosed for measuring the internal distortion within a fiber-reinforced composite material laminate by embedding the sensor portion of an optical fiber interferometer within the layers of a fiber-reinforced composite material laminate, and then using the sensor portion to measure the change in intensity of interference light (see patent reference 1). Furthermore, a method of embedding an optical fiber in an epoxy resin cast article such as an insulating molding for a high-voltage instrument is also known (see patent reference 2). Moreover, a method of embedding an optical fiber as a sensor within a plastic, metal, ceramic, concrete, a composite material that has been reinforced using an inorganic fiber such as SiC or a reinforcing fiber such as stainless steel fiber, or a laminate comprising a single material or a number of different materials, is also known (see patent reference 3).

Known collision sensors include falling rock sensors (see patent reference 4) and vehicle collision sensors (see patent references 5 to 7).

Acrylic optical fibers exhibit superior flexural strength and are more readily processed than silica-based optical fibers or glass-based optical fibers, and are consequently used in a wide variety of fields. However, the elastic modulus of acrylics decreases with increasing temperature, meaning acrylic optical fibers have a large temperature dependency, and are therefore unsuitable for use as optical fiber sensors.

Silicone rubbers exhibit excellent weather resistance and electrical properties, have a low compression set, and exhibit superior properties of heat resistance and cold resistance and the like, and are consequently widely used as matrix materials. By using a liquid silicone rubber for which the elastic modulus increases with increasing temperature, the temperature dependency of an acrylic optical fiber sensor can be significantly reduced, but the workability of such compositions is poor, and they are not suitable for mass production.

[Patent Reference 1] JP 4-361126 A
[Patent Reference 2] JP 11-165324 A
[Patent Reference 3] JP 2001-082918 A
[Patent Reference 4] JP 2002-267549 A
[Patent Reference 5] U.S. Pat. No. 5,335,749
[Patent Reference 6] WO 01/23224 A1
[Patent Reference 7] JP 2006-500284 A

SUMMARY OF THE INVENTION

An object of the present invention is to provide a silicone rubber composition for extrusion molding, (a) which yields a cured product for which the elastic modulus increases across a temperature range from 30 to 110° C. and which is therefore capable of reducing the temperature dependency of acrylic optical fibers, and (b) which is suitable for extrusion molding.

As a result of intensive investigation aimed at achieving the above object, the inventors of the present invention discovered that by ensuring that the vinyl group content within an entire silicone rubber composition is at least $1.0 \times 10^{-4}$ mol/g, a cured product could be obtained for which the elastic modulus increases across the temperature range from 30 to 110° C., and they were therefore able to complete the present invention.

Accordingly, a first aspect of the present invention provides a silicone rubber composition for extrusion molding, comprising:

(A) 100 parts by mass of an organopolysiloxane represented by an average composition formula (1) shown below:

$$R^1{}_n SiO_{(4-n)/2} \qquad (1)$$

(wherein, $R^1$ represents identical or different, unsubstituted or substituted monovalent hydrocarbon groups, and n represents a positive number within a range from 1.95 to 2.04), (B) 0 to 50 parts by mass of a vinyl group-containing silicon compound, (C) 5 to 100 parts by mass of a reinforcing silica, and (D) an effective quantity of a curing agent, wherein the vinyl group content relative to the combination of the components (A) through (D) is at least $1.0 \times 10^{-4}$ mol/g.

A second aspect of the present invention provides a cured product obtained by curing the above composition, wherein a rate of elastic modulus variation R for the cured product, calculated using a formula shown below:

$$R = (E_{100} - E_{30})/E_{30} \times 100$$

(wherein, $E_{30}$ represents an elastic modulus of the cured product at 30° C., and $E_{100}$ represents an elastic modulus of the cured product at 100° C.), is at least 5%.

A third aspect of the present invention provides an extrusion molded product comprising the above cured product.

A fourth aspect of the present invention provides a method for reducing the temperature dependency of an acrylic optical fiber sensor, comprising:

disposing a cured product of the above composition between a target material that is to be measured using the acrylic optical fiber sensor, and the acrylic optical fiber sensor.

According to a silicone rubber composition for extrusion molding of the present invention, a molded product can be obtained for which the elastic modulus increases across the temperature range from 30 to 110° C. A cured product of the composition of the present invention is useful in reducing the temperature dependency of acrylic optical fiber sensors.

DETAILED DESCRIPTION OF THE PREFERRED EMBODIMENTS

As follows is a more detailed description of the present invention. In the present invention, viscosity values represent values measured using a rotational viscometer.

[Component (A)]

The organopolysiloxane of the component (A) is represented by an average composition formula (1) shown below:

$$R^1{}_n SiO_{(4-n)/2} \qquad (1)$$

(wherein, $R^1$ represents identical or different, unsubstituted or substituted monovalent hydrocarbon groups, and n represents a positive number within a range from 1.95 to 2.04).

In the above formula (1), examples of $R^1$ include identical or different, unsubstituted or substituted monovalent hydrocarbon groups, typically of 1 to 20 carbon atoms, and preferably of 1 to 12, and even more preferably 1 to 8, carbon atoms. Specific examples of $R^1$ include alkyl groups such as a methyl group, ethyl group, propyl group or butyl group; cycloalkyl groups such as a cyclohexyl group; alkenyl groups such as a vinyl group, allyl group, butenyl group, or hexenyl group; aryl groups such as a phenyl group or tolyl group; aralkyl groups such as a β-phenylpropyl group; and groups in which either a portion of, or all of, the hydrogen atoms bonded to carbon atoms within the above hydrocarbon groups have been substituted with a halogen atom or a cyano group or the like, such as a chloromethyl group, trifluoropropyl group or cyanoethyl group.

In the above formula (1), n represents a positive number within a range from 1.95 to 2.04, and is preferably from 1.98 to 2.02. If the value of n is not within this range from 1.95 to 2.04, then the cured product of the resulting composition may not exhibit satisfactory rubber-like elasticity.

The molecular chain terminals of the organopolysiloxane of the component (A) are preferably terminated with trimethylsilyl groups, dimethylvinylsilyl groups, dimethylhydroxysilyl groups, methyldivinylsilyl groups or trivinylsilyl groups or the like, and are most preferably terminated with silyl groups that contain at least one vinyl group (such as dimethylvinylsilyl groups, methyldivinylsilyl groups and trivinylsilyl groups).

The organopolysiloxane of the component (A) contains at least two alkenyl groups bonded to silicon atoms within each molecule, and more specifically, from 0.001 to 10 mol %, and preferably from 0.01 to 5 mol %, of the $R^1$ groups are alkenyl groups. These alkenyl groups are preferably vinyl groups or allyl groups, and vinyl groups are particularly preferred.

The average polymerization degree of the organopolysiloxane of the component (A) is preferably at least 100, is even more preferably within a range from 3,000 to 100,000, and is most preferably from 4,000 to 20,000. The average polymerization degree can be determined by measuring the number average molecular weight by GPC (gel permeation chromatography), using polystyrenes as molecular weight markers, and then calculating the polymerization degree using the formula shown below.

Average polymerization degree=number average molecular weight/molecular weight of a repeating unit within the component (A)

In those cases where the component (A) comprises a plurality of different repeating units, the term "molecular weight of a repeating unit within the component (A)" used within the above formula refers to the number average molecular weight of that plurality of repeating units.

The organopolysiloxane of the component (A) may use either a single compound, or a mixture of two or more organopolysiloxanes with different average polymerization degrees or molecular structures or the like.

[Component (B)]

The vinyl group-containing silicon compound of the component (B) is an optional component that may be used as necessary within the present invention. The component (B) may use either a single compound, or a mixture of two or more different compounds. Examples of the component (B) include vinyl group-containing silanes and vinyl group-containing silazanes.

Specific examples of suitable vinyl group-containing silanes include vinyltrichlorosilane, vinyltrimethoxysilane, vinyltriethoxysilane, and p-styryltrimethoxysilane. An example of suitable vinyl group-containing silazane is 1,3-divinyl-1,1,3,3-tetramethylsilazane.

The quantity added of the component (B) is typically not more than 50 parts by mass (namely, from 0 to 50 parts by mass), and preferably not more than 20 parts by mass (namely, from 0 to 20 parts by mass), per 100 parts by mass of the component (A). If this quantity exceeds 50 parts by mass, then the resulting silicone rubber composition is prone to developing adhesiveness. In those cases where the component (B) is added to the composition of the present invention, the lower limit for the quantity added is typically at least 0.01 parts by mass per 100 parts by mass of the component (A).

[Component (C)]

The reinforcing silica of the component (C) is used to ensure that a silicone rubber with excellent mechanical strength is obtained. The specific surface area of the reinforcing silica of the component (C) is preferably 50 $m^2/g$ or greater, and is even more preferably within a range from 100 to 400 $m^2/g$. The specific surface area is measured using the BET method. The component (C) may use either a single material, or a combination of two or more different materials.

Examples of the reinforcing silica of the component (C) include any of the silica materials that have conventionally been used as reinforcing fillers for silicone rubbers, and specific examples include fumed silica and precipitated silica.

These reinforcing silica materials may be used in untreated form, or if required, may be subjected to a preliminary surface treatment using an organopolysiloxane, organopolysilazane, chlorosilane, or alkoxysilane or the like.

The blend quantity of the component (C) is typically within a range from 5 to 100 parts by mass, and is preferably from 10 to 70 parts by mass, per 100 parts by mass of the organopolysiloxane of the component (A). If this blend quantity is too large, then the workability of the resulting silicone rubber composition tends to deteriorate. In contrast, if the blend quantity is too small, then the cured product obtained by curing the silicone rubber composition may not exhibit satisfactory levels of mechanical strength such as tensile strength and tear strength.

[Component (D)]

The component (D) may employ any conventional curing agent used during either normal pressure hot air vulcanization or steam vulcanization of a silicone rubber. Examples of preferred curing agents for the component (D) include (i) organic peroxides, (ii) conventional combinations of an organohydrogenpolysiloxane and a platinum group metal-based catalyst that act as an addition reaction curing agent for the silicone rubber, as well as combinations of (i) and (ii). Of these possibilities, organic peroxides are particularly desirable. In any of the above cases, the component (D) is used in an effective quantity.

(i) Organic Peroxides

A silicone rubber can be produced with ease by subjecting the composition of the present invention to heat curing in the presence of an organic peroxide. This organic peroxide may use either a single compound, or a combination of two or more different compounds. Specific examples of suitable organic peroxides include chlorine-free organic peroxides such as benzoyl peroxide, para-methylbenzoyl peroxide, ortho-methylbenzoyl peroxide, 2,5-dimethyl-2,5-di-t-butylperoxyhexane, t-butyl peroxybenzoate, dicumyl peroxide, and cumyl-t-butyl peroxide. In the case of normal pressure hot air vulcanization, acyl-based organic peroxides such as benzoyl peroxide, para-methylbenzoyl peroxide and ortho-methylbenzoyl peroxide are particularly preferred.

The quantity added of the organic peroxide is preferably within a range from 0.1 to 10 parts by mass, and even more preferably from 0.3 to 5 parts by mass, per 100 parts by mass of the organopolysiloxane of the component (A). Provided the quantity falls within this range, the level of cross-linking is satisfactory, and the curing rate can be increased easily by increasing the quantity of the organic peroxide, which is desirable from an economic viewpoint.

(ii) Combinations of an Organohydrogenpolysiloxane and a Platinum Group Metal-Based Catalyst Platinum Group Metal-Based Catalyst In those cases where the composition of the present invention is cured via an addition reaction, an aforementioned combination of an organohydrogenpolysiloxane and a platinum group metal-based catalyst (ii) is used. The platinum group metal-based catalyst used in this addition reaction is a catalyst that promotes an addition reaction between the aliphatic unsaturated groups (such as alkenyl groups or diene groups) within the component (A) and the vinyl groups within the component (B), and the silicon atom-bonded hydrogen atoms (namely, SiH groups) of the organohydrogenpolysiloxane within the curing agent (ii). The platinum group metal-based catalyst may use either a single catalyst or a combination of two ore more different catalysts.

Examples of the platinum group metal-based catalyst include simple platinum group metals and compounds thereof, and those materials conventionally used as catalysts within addition reaction-curable silicone rubber compositions can be used. Specific examples of such catalysts include fine particles of platinum metal adsorbed to a carrier such as silica, alumina or silica gel, platinic chloride, chloroplatinic acid, an alcohol solution of chloroplatinic acid hexahydrate, as well as palladium catalysts and rhodium catalysts, although of these, catalysts containing platinum are preferred.

The quantity added of the platinum group metal-based catalyst need only be sufficient to enable effective acceleration of the aforementioned addition reaction, and a typical quantity, calculated as a quantity of the platinum group metal relative to the quantity of the organopolysiloxane of the component (A), is within a range from 1 ppm (by mass, this also applies below) to 1% by mass, and a quantity from 10 to 500 ppm is preferred. Provided the quantity falls within this range, the addition reaction can be satisfactorily accelerated, curing occurs satisfactorily, and the rate of the addition reaction can be increased easily by increasing the quantity of the catalyst, which is desirable from an economic viewpoint.

Organohydrogenpolysiloxane

The organohydrogenpolysiloxane may be a straight-chain, cyclic or branched structure, provided it contains two or more, and preferably three or more, SiH groups within each molecule. The organohydrogenpolysiloxane may use either a single compound, or a combination of two or more different compounds. Examples of this organohydrogenpolysiloxane include conventional organohydrogenpolysiloxanes used as cross-linking agents within addition reaction-curable silicone rubber compositions, and specific examples include the organohydrogenpolysiloxanes represented by the average composition formula (2) shown below.

$$R^2_p H_q SiO_{(4-p-q)/2} \qquad (2)$$

(wherein, $R^2$ represents identical or different, unsubstituted or substituted monovalent hydrocarbon groups, and p and q are positive numbers that satisfy $0 \leq p < 3$, $0 < q \leq 3$, and $0 < p+q \leq 3$, and preferably satisfy $1 \leq p \leq 2.2$, $0.002 \leq q \leq 1$, and $1.002 \leq p+q \leq 3$)

In the above average composition formula (2), examples of $R^2$ include identical or different, unsubstituted or substituted monovalent hydrocarbon groups, preferably of 1 to 12 carbon atoms, and even more preferably of 1 to 8 carbon atoms, and these groups preferably contain no aliphatic unsaturated bonds. Specific examples of $R^2$ include alkyl groups such as a methyl group, ethyl group, or propyl group; cycloalkyl groups such as a cyclohexyl group; alkenyl groups such as a vinyl group, allyl group, butenyl group, or hexenyl group; aryl groups such as a phenyl group or tolyl group; aralkyl groups such as a benzyl group, 2-phenylethyl group, or 2-phenylpropyl group; and groups in which either a portion of, or all of, the hydrogen atoms within the above hydrocarbon groups have been substituted with halogen atoms or the like such as fluorine atoms, including a 3,3,3-trifluoropropyl group.

In those cases where this organohydrogenpolysiloxane is a straight-chain structure, the SiH groups may be located solely at the molecular chain terminals, solely at non-terminal positions, or may also exist at both of these locations. Furthermore, the viscosity of this organohydrogenpolysiloxane at 25° C. is preferably within a range from 0.5 to 10,000 mm$^2$/s, and is even more preferably from 1 to 300 mm$^2$/s.

Specific examples of this type of organohydrogenpolysiloxane include the compounds with the structural formulas shown below.

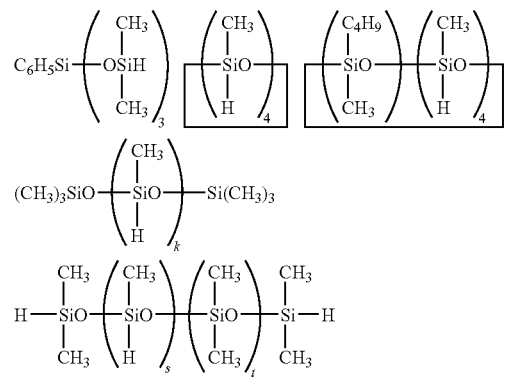

(wherein, k represents an integer from 2 to 10, and s and t each represent an integer from 0 to 10)

The blend quantity of the above organohydrogenpolysiloxane is preferably sufficient that for each 1 mol of the combination of aliphatic unsaturated bonds (such as alkenyl groups or diene groups) within the component (A) and vinyl groups within the component (B), the quantity of SiH groups within the organohydrogenpolysiloxane is within a range from 0.5 to 5 mols, and even more preferably from 0.8 to 4 mols. Provided the blend quantity falls within this range, the level of cross-linking is satisfactory, and the mechanical strength following curing is adequate. This blend quantity can usually be achieved by adding from 0.1 to 50 parts by mass of the above organohydrogenpolysiloxane per 100 parts by mass of the component (A).

[Other Components]

In addition to the components described above, an organosilane or organopolysiloxane represented by a formula (3) shown below (hereafter referred to as the component (E)) may also be added to the composition of the present invention if required.

$$R^4 O(SiR^3_2 O)_m R^4 \qquad (3)$$

(wherein, $R^3$ represents identical or different, unsubstituted or substituted monovalent hydrocarbon groups, m represents a positive number within a range from 1 to 50, and each $R^4$ represents, independently, an alkyl group or a hydrogen atom)

The component (E) contains alkoxy groups or hydroxyl groups at the molecular chain terminals. This component (E) functions as a treatment agent for treating the reinforcing silica of the component (C). The component (E) may use either a single compound, or a combination of two or more different compounds.

In the above formula (3), examples of $R^3$ include alkyl groups such as a methyl group, ethyl group, propyl group or butyl group; cycloalkyl groups such as a cyclohexyl group; alkenyl groups such as a vinyl group, allyl group, butenyl group, or hexenyl group; aryl groups such as a phenyl group or tolyl group; aralkyl groups such as a (3-phenylpropyl group; and groups in which either a portion of, or all of, the hydrogen atoms bonded to carbon atoms within the above hydrocarbon groups have been substituted with a halogen atom or a cyano group or the like, such as a chloromethyl group, trifluoropropyl group or cyanoethyl group, and from the viewpoint of achieving favorable compatibility with the organopolysiloxane of the component (A), the $R^3$ groups are preferably the same as the monovalent hydrocarbon groups R', or the combination of $R^1$ groups, employed within the component (A).

In the above formula (3), examples of $R^4$ include a hydrogen atom, or an alkyl group such as a methyl group, ethyl group, propyl group or butyl group.

In the formula (3), the average polymerization degree m is within a range from 1 to 50, and is preferably within a range from 2 to 30. Provided the value of m is within this range, the effect of the component (E) as a treatment agent for treating the reinforcing silica of the component (C) can be satisfactorily realized. The average polymerization degree can be determined in the manner described above.

In those cases where the component (E) is added to the composition of the present invention, the blend quantity is preferably within a range from 0.5 to 50 parts by mass per 100 parts by mass of the component (A). Provided the blend quantity is within this range, the resulting silicone rubber composition can be prevented from developing adhesiveness, kneading of the composition is facilitated, and replasticization can be more readily suppressed.

In addition to the components described above, if required, the composition of the present invention may also include ground quartz, non-reinforcing silica such as crystalline silica, carbon blacks such as acetylene black, furnace black and channel black, fillers such as calcium carbonate, other additives such as colorants, tear strength improvers, heat resistance improvers, flame retardancy improvers, acid receivers, and thermal conductivity improvers, and release agents or filler dispersants such as the various alkoxysilanes, and particularly phenyl group-containing alkoxysilanes or the hydrolysis-condensation products thereof, diphenylsilanediol, carbon functional silanes, and low molecular weight siloxanes that contain silanol groups.

[Vinyl Group Content]

In the present invention, the vinyl group content relative to the combination of the components (A) through (D) is at least $1.0 \times 10^{-4}$ mol/g, and is preferably within a range from $1.0 \times 10^{-4}$ to $1.0 \times 10^{-2}$ mol/g. If the content is less than $1.0 \times 10^{-4}$ mol/g, then the cured product of the resulting composition is less likely to exhibit an increasing elastic modulus across the temperature range from 30 to 110° C.

[Rate of Elastic Modulus Variation]

The composition of the present invention yields a cured product for which the elastic modulus increases across the temperature range from 30 to 110° C. Specifically, the composition yields a cured product for which the rate of elastic modulus variation R, calculated using the formula shown below:

$$R = (E_{100} - E_{30})/E_{30} \times 100$$

(wherein, $E_{30}$ represents the elastic modulus of the cured product at 30° C., and $E_{100}$ represents the elastic modulus of the cured product at 100° C.), is preferably at least 5%. The elastic modulus is measured using a solid viscoelasticity measurement apparatus, at a frequency of 30 Hz and a rate of temperature increase of 5° C./minute.

[Production Method]

The silicone rubber composition of the present invention can be obtained by uniformly mixing the components described above using a rubber kneader such as a two roll mill, Banbury mixer, or dough mixer (kneader) or the like. A heat treatment (for example, mixing under heating at 80 to 250° C.) may also be conducted if required. All of the components may be mixed together simultaneously at room temperature, or the components (A) to (C) and any other components may be mixed together first under heat, and the component (D) then mixed into the resulting mixture at room temperature.

[Extrusion Molding]

The silicone rubber composition obtained in this manner can be molded by extrusion molding in accordance with the intended application of the composition. The curing temperature may be selected in accordance with factors such as the nature of the curing agent, the extrusion method employed, and the thickness of the target molded article, but is typically within a range from 80 to 500° C.

[Applications]

By disposing a cured product of the composition of the present invention between a target material that is to be measured using an acrylic optical fiber sensor, and the acrylic optical fiber sensor, the temperature dependency of the acrylic optical fiber sensor can be reduced. In such cases, the cured product may be sandwiched between the material and the acrylic optical fiber sensor, an acrylic optical fiber sensor that has been surface-coated with the cured product may be embedded within the material, or the acrylic optical fiber sensor (which may be either surface-coated with the cured product or not surface-coated) may be embedded within a material in which the surface that contacts the optical fiber sensor has been coated with the cured product.

EXAMPLES

As follows is a description of specifics of the present invention using a series of examples and comparative examples, although the present invention is in no way limited by the examples presented below. Unless stated otherwise, operations were conducted at room temperature (25° C.).

Example 1

100 parts by mass of an organopolysiloxane consisting of 99.431 mol % of dimethylsiloxane units, 0.544 mol % of methylvinylsiloxane units and 0.025 mol % of dimethylvinylsiloxane units, and with an average polymerization degree of approximately 8,000, 20 parts by mass of a fumed silica with a BET specific surface area of 200 m²/g (product name: Aerosil (a registered trademark) 200, manufactured by Nippon Aerosil Co., Ltd.), 4 parts by mass of a dimethylpolysiloxane having silanol groups at both terminals and with an average polymerization degree of 15, 0.45 parts by mass of vinyltrimethoxysilane, and 0.01 parts by mass of 1,3-divinyl- 1,1,3,3-tetramethyldisilazane were placed in a kneader and subjected to kneading under heating at 180° C. for two hours, thus yielding a base compound. To 100 parts by mass of this base compound was added 0.8 parts by mass of 1,6-hexanediol-t-butylperoxycarbonate as a cross-linking agent, and the resulting mixture was mixed uniformly using a two roll mill, yielding a composition 1.

Example 2

100 parts by mass of an organopolysiloxane consisting of 99.5 mol % of dimethylsiloxane units, 0.475 mol % of methylvinylsiloxane units and 0.025 mol % of dimethylvinylsiloxane units, and with an average polymerization degree of approximately 8,000, 22 parts by mass of a fumed silica with a BET specific surface area of 300 m$^2$/g (product name: Aerosil 300, manufactured by Nippon Aerosil Co., Ltd.), 0.5 parts by mass of vinyltrimethoxysilane, 3 parts by mass of a methylvinylpolysiloxane with an average polymerization degree of 15 and a vinyl group content of 0.0013 mol/g, and 0.01 parts by mass of 1,3-divinyl-1,1,3,3-tetramethyldisilazane were placed in a kneader and subjected to kneading under heating at 180° C. for two hours, thus yielding a base compound. To 100 parts by mass of this base compound was added 0.8 parts by mass of 1,6-hexanediol-t-butylperoxycarbonate as a cross-linking agent, and the resulting mixture was mixed uniformly using a two roll mill, yielding a composition 2.

Example 3

100 parts by mass of an organopolysiloxane consisting of 99.85 mol % of dimethylsiloxane units, 0.125 mol % of methylvinylsiloxane units and 0.025 mol % of dimethylvinylsiloxane units, and with an average polymerization degree of approximately 8,000, 1 part by mass of a dimethylpolysiloxane with both molecular chain terminals blocked with dimethylvinylsiloxy groups and with a viscosity at 25° C. of 5,000 mPa·s, 1 part by mass of an organopolysiloxane resin consisting of 6.5 mol % of $(CH_3)_2(CH_2=CH)SiO_{1/2}$ units, 54 mol % of $SiO_2$ units and 39.5 mol % of $(CH_3)_3SiO_{1/2}$ units, 22 parts by mass of a fumed silica with a BET specific surface area of 300 m$^2$/g (product name: Aerosil 300, manufactured by Nippon Aerosil Co., Ltd.), 0.5 parts by mass of vinyltrimethoxysilane, 3 parts by mass of a methylvinylpolysiloxane with an average polymerization degree of 15 and a vinyl group content of 0.0013 mol/g, and 0.01 parts by mass of 1,3-divinyl-1,1,3,3-tetramethyldisilazane were placed in a kneader and subjected to kneading under heating at 180° C. for two hours, thus yielding a base compound. To 100 parts by mass of this base compound was added 0.8 parts by mass of 1,6-hexanediol-t-butylperoxycarbonate as a cross-linking agent, and the resulting mixture was mixed uniformly using a two roll mill, yielding a composition 3.

Comparative Example 1

84 parts by mass of an organopolysiloxane consisting of 99.85 mol % of dimethylsiloxane units, 0.125 mol % of methylvinylsiloxane units and 0.025 mol % of dimethylvinylsiloxane units, and with an average polymerization degree of approximately 8,000, 16 parts by mass of an organopolysiloxane consisting of 99.975 mol % of dimethylsiloxane units and 0.025 mol % of dimethylvinylsiloxane units, and with an average polymerization degree of approximately 8,000, 47 parts by mass of a fumed silica with a BET specific surface area of 200 m$^2$/g (product name: Aerosil 200, manufactured by Nippon Aerosil Co., Ltd.), 20 parts by mass of a dimethylpolysiloxane having silanol groups at both terminals and with an average polymerization degree of 15, and 0.15 parts by mass of vinyltrimethoxysilane were placed in a kneader and subjected to kneading under heating at 180° C. for two hours, thus yielding a base compound. To 100 parts by mass of this base compound was added 0.8 parts by mass of 1,6-hexanediol-t-butylperoxycarbonate as a cross-linking agent, and the resulting mixture was mixed uniformly using a two roll mill, yielding a composition 4.

Comparative Example 2

100 parts by mass of an organopolysiloxane consisting of 99.85 mol % of dimethylsiloxane units, 0.125 mol % of methylvinylsiloxane units and 0.025 mol % of dimethylvinylsiloxane units, and with an average polymerization degree of approximately 8,000, 40 parts by mass of a precipitated silica with a BET specific surface area of 201 m$^2$/g (product name: NIPSIL (a registered trademark)-LP, manufactured by Nippon Silica Industry Co., Ltd.), and 8 parts by mass of a dimethylpolysiloxane having silanol groups at both terminals and with an average polymerization degree of 15 were placed in a kneader and subjected to kneading under heating at 180° C. for two hours, thus yielding a base compound. To 100 parts by mass of this base compound was added 0.8 parts by mass of 1,6-hexanediol-t-butylperoxycarbonate as a cross-linking agent, and the resulting mixture was mixed uniformly using a two roll mill, yielding a composition 5.

Comparative Example 3

60 parts by mass of a dimethylpolysiloxane with both molecular chain terminals blocked with dimethylvinylsiloxy groups and with a viscosity at 25° C. of 5,000 mPa·s, 15 parts by mass of a dimethylpolysiloxane with both molecular chain terminals blocked with dimethylvinylsiloxy groups and with a viscosity at 25° C. of 1,000 mPa·s, 25 parts by mass of an organopolysiloxane resin consisting of 6.5 mol % of $(CH_3)_2(CH_2=CH)SiO_{1/2}$ units, 54 mol % of $SiO_2$ units and 39.5 mol % of $(CH_3)_3SiO_{1/2}$ units, 4.4 parts by mass of a methylvinylpolysiloxane with an average polymerization degree of 15 and a vinyl group content of 0.0013 mol/g, 10 parts by mass of a methylhydrogenpolysiloxane having SiH groups at both molecular chain terminals and at non-terminal positions within the molecular chain (SiH group content: 0.0060 mol/g) and with an average polymerization degree of 17, and 0.25 parts by mass of a complex of chloroplatinic acid and divinyltetramethyldisiloxane (platinum atom concentration: 1% by mass) as a hydrosilylation catalyst were mixed together in a two roll mill, yielding a composition 6.

[Preparation of Test Specimens and Test Sheets]

Each of the compositions 1 to 5 was subjected to press curing for 10 minutes under conditions including a temperature of 165° C. and a pressure of 100 kgf/cm$^2$, and was then subjected to secondary vulcanization at 200° C. for 4 hours, thus preparing test sheets and test specimens appropriate for each of the measurements described below. The composition 6 was subjected to press curing for 10 minutes under conditions including a temperature of 120° C. and a pressure of 100 kgf/cm$^2$, and was then subjected to secondary vulcanization at 150° C. for one hour, thus preparing test sheets and test specimens appropriate for each of the measurements described below.

[Elastic Modulus, Rate of Elastic Modulus Variation]

A test specimen with a thickness of 2 mm, a width of 5 mm and a length of 20 mm was used. Using a solid viscoelasticity measurement apparatus (manufactured by Yoshimizu Corporation), the elastic modulus of the test specimen was measured at a frequency of 30 Hz and a rate of temperature increase of 5° C./minute. The rate of elastic modulus variation (%) was calculated using the formula below:

[(Elastic modulus at 110° C.)−(elastic modulus at 30° C.)]/(elastic modulus at 30° C.)×100

The results are shown in Table 1.

[Density, Hardness, Tensile Strength, and Breaking Elongation]

Test sheets prepared in accordance with JIS K 6249 were measured for density, hardness, tensile strength, and breaking elongation in accordance with the methods described in JIS K 6249. The results are shown in Table 1.

[Rebound Resilience]

A test specimen prepared in accordance with JIS K 6255 was measured for rebound resilience in accordance with the method described in JIS K 6255. The results are shown in Table 1.

[Extrusion Performance]

Using an extruder of 60 mmΦ, each of the compositions 1 to 5 was extruded in a circular cylindrical form from a circular die with a diameter of 2.5 mm, and then cured at 200° C., and those compositions for which no foaming was detectable were evaluated as having favorable extrusion performance and were recorded in Table 1 using the symbol O. If foaming was noticeable, then the extrusion performance was evaluated as poor, and was recorded in Table 1 using the symbol Δ. The composition 6 was liquid, and could therefore not be extruded. It is recorded in Table 1 using the symbol x.

wherein a vinyl group content relative to a combination of components (A) through (D) is at least $1.0 \times 10^{-4}$ mol/g, and monitoring the structural material for distortion with the acrylic optical fiber sensor.

2. The method of claim 1, wherein the cured product of the silicon rubber composition has a rate of elastic modulus variation R of at least 5% calculated using a formula shown below:

$$R = (E_{100} - E_{30})/E_{30} \times 100$$

wherein, $E_{30}$ represents an elastic modulus of the cured product at 30° C. and $E_{100}$ represents an elastic modulus of the cured product at 100° C.

3. The method of claim 1, wherein the specific surface area of the component (C) measured using the BET method is 50 m$^2$/g or greater.

4. The method of claim 1, wherein the curing agent (D) is at least one curing agent selected from the group consisting of (i) an organic peroxide and (ii) a combination of an organo hydrogen polysiloxane and a platinum group metal-based catalyst.

5. The method of claim 1, wherein the silicon rubber composition further comprises:

(E) 0.5 to 50 parts by mass of an organosilane or organopolysiloxane represented by a formula (3) per 100 parts by mass of the component (A):

$$R^4O(SiR^3{}_2O)_mR^4 \quad (3)$$

wherein, $R^3$ represents identical or different, unsubstituted or substituted monovalent hydrocarbon groups, m rep-

TABLE 1

|  | Example 1 | Example 2 | Example 3 | Comparative example 1 | Comparative example 2 | Comparative example 3 |
|---|---|---|---|---|---|---|
| Vinyl group content (mol/g) | $1.0 \times 10^{-4}$ | $2.5 \times 10^{-4}$ | $3.2 \times 10^{-4}$ | $2.1 \times 10^{-5}$ | $1.5 \times 10^{-5}$ | $2.9 \times 10^{-4}$ |
| Elastic modulus (MPa) 30° C. | 2.8 | 4.8 | 4.1 | 5.7 | 3.1 | 2.7 |
| Rate of elastic modulus variation (%) | 16 | 17 | 15 | −17 | 9 | 25 |
| Density (g/cm$^3$) | 1.08 | 1.09 | 1.08 | 1.16 | 1.15 | 1.02 |
| Hardness (durometer A) | 54 | 63 | 54 | 61 | 51 | 58 |
| Tensile strength (MPa) | 5.9 | 3.8 | 3.9 | 9.2 | 7.8 | 8.2 |
| Breaking elongation (%) | 260 | 120 | 220 | 560 | 360 | 130 |
| Rebound resilience (%) | 84 | 87 | 84 | 53 | 74 | 78 |
| Extrusion performance | o | o | o | o | Δ | x |

What is claimed is:

1. A method, comprising:
disposing a cured product of a silicon rubber composition between a structural material that is to be measured with an acrylic optical fiber sensor comprising an acrylic optical fiber, and the acrylic optical fiber sensor,
wherein the silicon rubber composition comprises:
(A) 100 parts by mass of an organopolysiloxane represented by an average composition formula (1) shown below:

$$R^1{}_nSiO_{(4-n)/2} \quad (1)$$

wherein, $R^1$ represents identical or different, unsubstituted or substituted monovalent hydrocarbon groups, and n represents a positive number within a range from 1.95 to 2.04,
(B) 0 to 50 parts by mass of a vinyl group-containing silicon compound,
(C) 5 to 100 parts by mass of a reinforcing silica, and
(D) an effective quantity of a curing agent, resents a positive number within a range from 1 to 50, and each $R^4$ represents, independently, an alkyl group or a hydrogen atom.

6. The method of claim 1, wherein component (B) of the silicone rubber composition is at least one selected from the group consisting of vinyltrichlorosilane, vinyltrimethoxysilane, vinyltriethoxysilane, p-styryltrimethoxysilane and 1,3-divinyl-1,1,3,3-tetramethylsilazane.

7. The method of claim 1, wherein component (B) is a vinyl group-containing silane.

8. The method of claim 1, wherein component (B) is a vinyl group-containing silazane.

9. The method according to claim 1, wherein component (B) is present in the silicon rubber composition in an amount of from 0.46 to 20 parts by mass.

10. The method of claim 1, wherein n represents a positive number within a range of from 1.98 to 2.02.

11. The method of claim 1, wherein component (B) is at least one of a vinyl trimethoxysilane and 1,3-divinyl-1,1,3,3-tetramethyldisilazane.

12. The method according to claim 1, wherein the vinyl group content relative to a combination of components (A) through (D) is $1.0\times10^{-4}$ to $1.0\times10^{-2}$ mol/g.

13. The method according to claim 1, wherein the elastic modulus variation R of the cured product of the silicone rubber composition is from 5 to 17%,
wherein the elastic modulus variation R is calculated using the formula:

$$R=(E_{100}-E_{30})/E_{30}\times100$$

wherein $E_{30}$ represents an elastic modulus of the cured product at 30° C. and $E_{100}$ represents an elastic modulus of the cured product at 100° C.

14. A method for monitoring a structural material for distortion with an acrylic optical fiber sensor comprising an acrylic optical fiber having reduced temperature dependency, comprising:
disposing a cured product of a silicon rubber composition between the structural material that is to be monitored with the acrylic optical fiber sensor, and the acrylic optical fiber sensor,
wherein the silicon rubber composition comprises:
(A) 100 parts by mass of an organopolysiloxane represented by an average composition formula (1) shown below:

$$R^1{}_n SiO_{(4-n)/2} \qquad (1)$$

wherein, $R^1$ represents identical or different, unsubstituted or substituted monovalent hydrocarbon groups, and n represents a positive number within a range from 1.95 to 2.04,
(B) 0 to 50 parts by mass of a vinyl group-containing silicon compound,
(C) 5 to 100 parts by mass of a reinforcing silica, and
(D) an effective quantity of a curing agent,
wherein a vinyl group content relative to a combination of components (A) through (D) is at least $1.0\times10^{-4}$ mol/g; and
monitoring the structural material for distortion with the acrylic optical fiber sensor.

* * * * *